United States Patent
Elder et al.

(10) Patent No.: US 6,253,068 B1
(45) Date of Patent: Jun. 26, 2001

(54) FULLY INTEGRATED ALL-CMOS AM TRANSMITTER WITH AUTOMATIC ANTENNA TUNING

(75) Inventors: Joseph S. Elder, Orlando; Joseph T. Yestrebsky, Apopka; Mohammed D. Islam, Winter Park, all of FL (US)

(73) Assignee: Micrel, Incorporated, San Jose, CA (US)

( * ) Notice: Subject to any disclaimer, the term of this patent is extended or adjusted under 35 U.S.C. 154(b) by 0 days.

(21) Appl. No.: 09/074,997

(22) Filed: May 8, 1998

Related U.S. Application Data

(60) Provisional application No. 60/046,128, filed on May 9, 1997.

(51) Int. Cl.[7] .................................................. H04B 1/00
(52) U.S. Cl. ............................ 455/121; 455/91; 455/129
(58) Field of Search .............................. 455/91, 92, 95, 455/128, 129, 108, 110, 111, 124, 69, 226.2, 311, 341, 33.1, 59.1, 59.2, 70, 212, 213, 249.1, 250.1, 333, 326; 331/107 A, 108 B; 340/925.5; 330/129, 150, 257, 263, 288, 320, 311

(56) References Cited

U.S. PATENT DOCUMENTS

| | | | |
|---|---|---|---|
| 3,813,614 | * | 5/1974 | Darrow .......................... 331/108 B |
| 4,327,444 | * | 4/1982 | Court .................................. 455/100 |
| 4,761,616 | * | 8/1988 | Ash ....................................... 331/107 |
| 4,816,769 | * | 3/1989 | Ma et al. ............................... 329/50 |
| 4,857,893 | * | 8/1989 | Carroll ................................ 340/572 |
| 5,031,192 | * | 7/1991 | Clark ....................................... 375/1 |
| 5,508,706 | * | 4/1996 | Tsou et al. ........................... 342/192 |
| 5,512,901 | * | 4/1996 | Chen et al. .......................... 342/175 |
| 5,534,845 | * | 7/1996 | Issa et al. ......................... 340/425.5 |
| 5,555,276 | * | 9/1996 | Koenck et al. ...................... 375/303 |
| 5,689,814 | * | 11/1997 | Hagisawa et al. ..................... 455/69 |
| 5,818,880 | * | 10/1998 | Kriz et al. ........................... 375/306 |
| 5,912,632 | * | 6/1999 | Dieska et al. .................. 340/825.44 |

FOREIGN PATENT DOCUMENTS

WO 90/06633    6/1990  (WO).

OTHER PUBLICATIONS

M. Biehl: "A Fully–Integrated 900 MHz Spread–Spectrum Transmitter" Proceedings of the International Conference on Consumer Electronics, Roesemont, Jun. 8–10, 1993, no. CONF. 12, Jun. 8, 1993, p. 308/309 XP000427629 Institute of Electrical and Electronics Engineers.

* cited by examiner

*Primary Examiner*—Daniel Hunter
*Assistant Examiner*—Pablo Tran
(74) *Attorney, Agent, or Firm*—Skjerven Morrill MacPherson LLP

(57) ABSTRACT

A monolithic AM transmitter is disclosed. An external antenna forms part of a resonance network so that the antenna resonance point is automatically tuned to the transmit frequency. This provides flexibility with no added cost to the transmitter.

22 Claims, 2 Drawing Sheets

FULLY INTEGRATED ALL-CMOS AM TRANSMITTER WITH AUTOMATIC ANTENNA TUNING

CROSS-REFERENCE TO RELATED APPLICATIONS

This application is based on the provisional application Ser. No. 60/046,128, filed May 9, 1997, entitled Fully Integrated All-CMOS AM Transmitter With Automatic Antenna Tuning, by J. Scott Elder, Joseph T. Yestrebsky, and Mohammed D. Islam.

FIELD OF THE INVENTION

This invention relates to transmitters and, in particular, to an integrated transmitter with automatic antenna tuning.

INTRODUCTION

Figure 1:
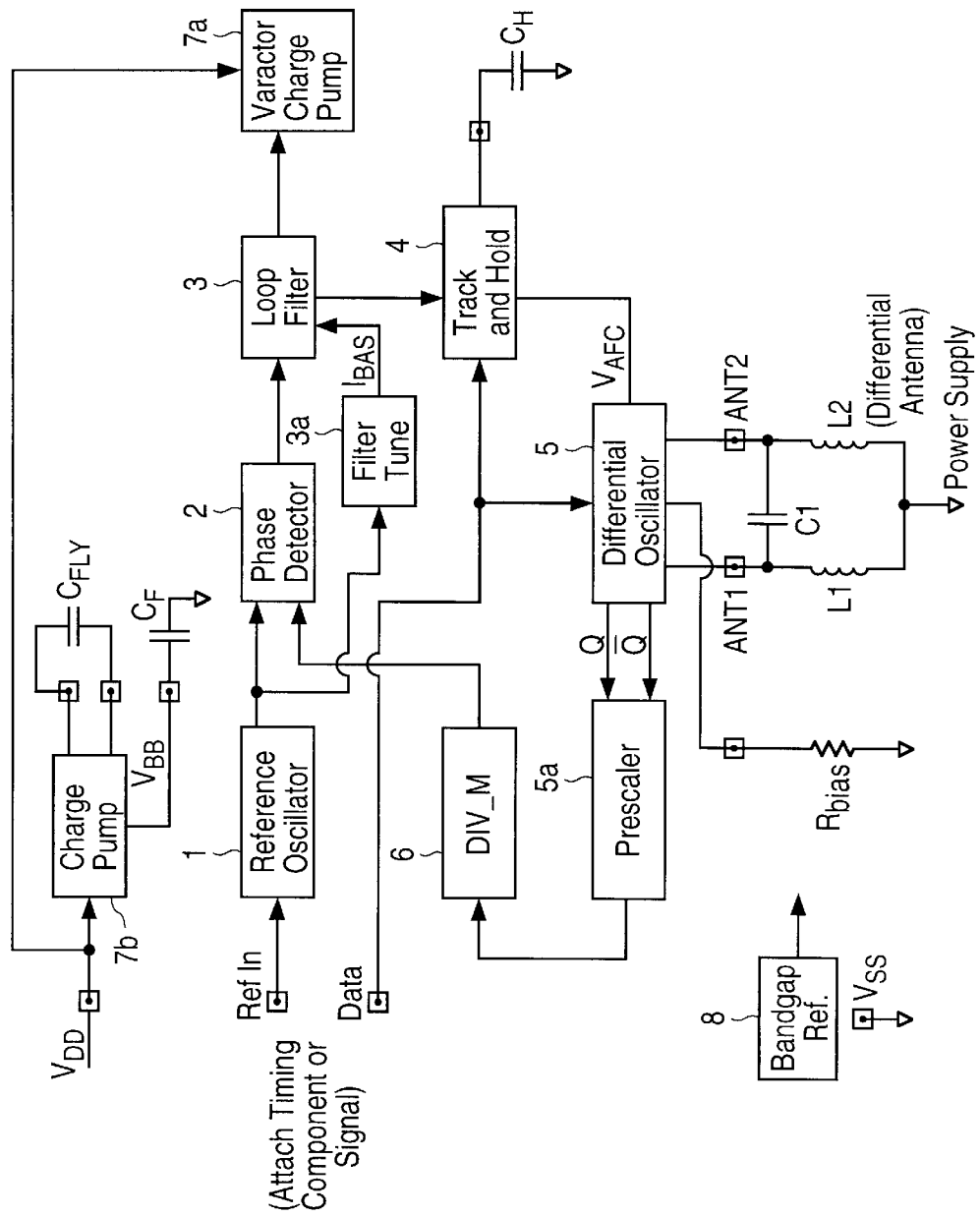
FIG. 1 is a block diagram illustrating the functional units in a transmitter in accordance with one embodiment of the invention.

FIG. 1 illustrates the basic structure and elements of one embodiment of the invention, a Fully Integrated All-CMOS AM Transmitter with Automatic Antenna Tuning. All elements are constructed using Complementary Metal Oxide Semiconductor (CMOS) technology. CMOS technology also embodies other bipolar type elements like diodes, transistors, and others. Where appropriate, these device types are used. The elements of the invention are as follows, with associated reference number:

| Functional Element | Reference No. |
| --- | --- |
| a. Reference Oscillator | 1 |
| b. Phase Detector | 2 |
| c. Loop Filter | 3 |
| d. Filter Tune | 3a |
| e. Track and Hold | 4 |
| f. Differential Oscillator | 5 |
| g. Prescaler | 5a |
| h. Div_M | 6 |
| i. Varactor Charge Pump | 7a |
| j. Charge Pump | 7b |
| k. Bandgap Reference | 8 |

By fully integrated, we mean that all of these functions in their entirety have been simultaneously incorporated onto a single semiconductor die (integrated circuit or IC). This we believe is an extension of the present state-of-the-art. Aside from power supply decoupling capacitors, no external components are required except an antenna (L1, L2), and antenna resonating capacitor (C1). Additional aspects of the invention (to be detailed subsequently) further extend the art by reducing overall transmitter system complexity, cost, while improving transmitter performance.

Special Charge Pump circuitry is included within the invention to allow the invention to function in applications which use a wide range of supply voltages. This makes the invention quite general in nature, and lowers overall radio system costs. To protect nFET devices from hot-electron effects in applications with large external supply voltages, nFETs are cascaded to guarantee nFET drain-to-source voltage is clamped to acceptable levels.

DETAILED DESCRIPTION OF INVENTION

Reference Oscillator 1 generates a precise timing waveform based on a timing element or timing signal applied externally at the extremities of the invention.

Phase Detector 2, Loop Filter 3, Filter Tune 3a, Differential Oscillator 4, and Div_M 5 collectively form a phase-lock-loop (PLL) where the frequency of the Differential Oscillator is locked to that of the Reference Oscillator.

Filter Tune 3a itself is a phase-lock-loop tuned to the Reference Oscillator. Filter Tune generates a bias current Ibias for the Loop Filter 3. This approach stabilizes the Loop Filter performance characteristics against semiconductor process and temperature variations.

The Differential Oscillator serves as the source of the transmit frequency. It is important to note that this oscillator is within the PLL and is in actuality a voltage controlled oscillator (VCO). Oscillator tuning is accomplished by means of a differential structure of diffusion type p-n diodes within the Differential Oscillator function. We call these varactor diodes in the invention. External tuning diodes connected in a differential manner will also work but come with added system cost.

The Differential Oscillator provides a differential output into a (differential) antenna L1, L2. The antenna is coarsely tuned by capacitor C1, and fine tuned to the Reference Oscillator frequency via the varactor diode(s). L1, L2, and C1 are externally applied to the invention. For less demanding applications, where harmonic distortion is less important, a Differential Oscillator may not be necessary. An alternative embodiment is a single-ended oscillator, which reduces IC pin count.

Addition of resistor Rbias to the invention sets the bias current in the Differential Oscillator, which in turn sets the transmit power level. For fixed transmit power applications, this bias may be fixed on the semiconductor device.

Output from the Differential Oscillator is divided down by function Div_M 6, which produces a frequency near the Reference Oscillator frequency, within the locking and tracking range of the PLL.

A Charge Pump 7b provides voltage multiplication, which allows the invention to operate with supply voltages below 3V. An externally applied pumping capacitor is required with the Charge Pump. This supply voltage generation technique can either be open loop controlled or closed loop controlled. In a closed loop application, the charge pump operation ceases when the external supply voltage is sufficient for proper operation of the invention. In an open loop application, the voltage settles to an integer multiple of the input voltage source. The invention design is capable of operating with an external supply voltage greater than 12V.

Track and Hold 4 provides the means to hold the Loop Filter (frequency) control voltage during transmit 'spaces', when the differential Oscillator is disabled. This function requires an externally applied hold capacitor $C_H$. Alternative embodiment is a Track and Hold function where the hold capacitance is integrated (e.g., a DAC approach)

A Bandgap Reference circuit provides temperature and supply voltage compensated bias voltages and currents for critical nodes within the invention.

The invention allows for packaging in a 10 pin package. In applications where the charge pump is not required (i.e. adequate supply voltage exists for proper device operation), embodiments with fewer pins are possible.

Figure 2:
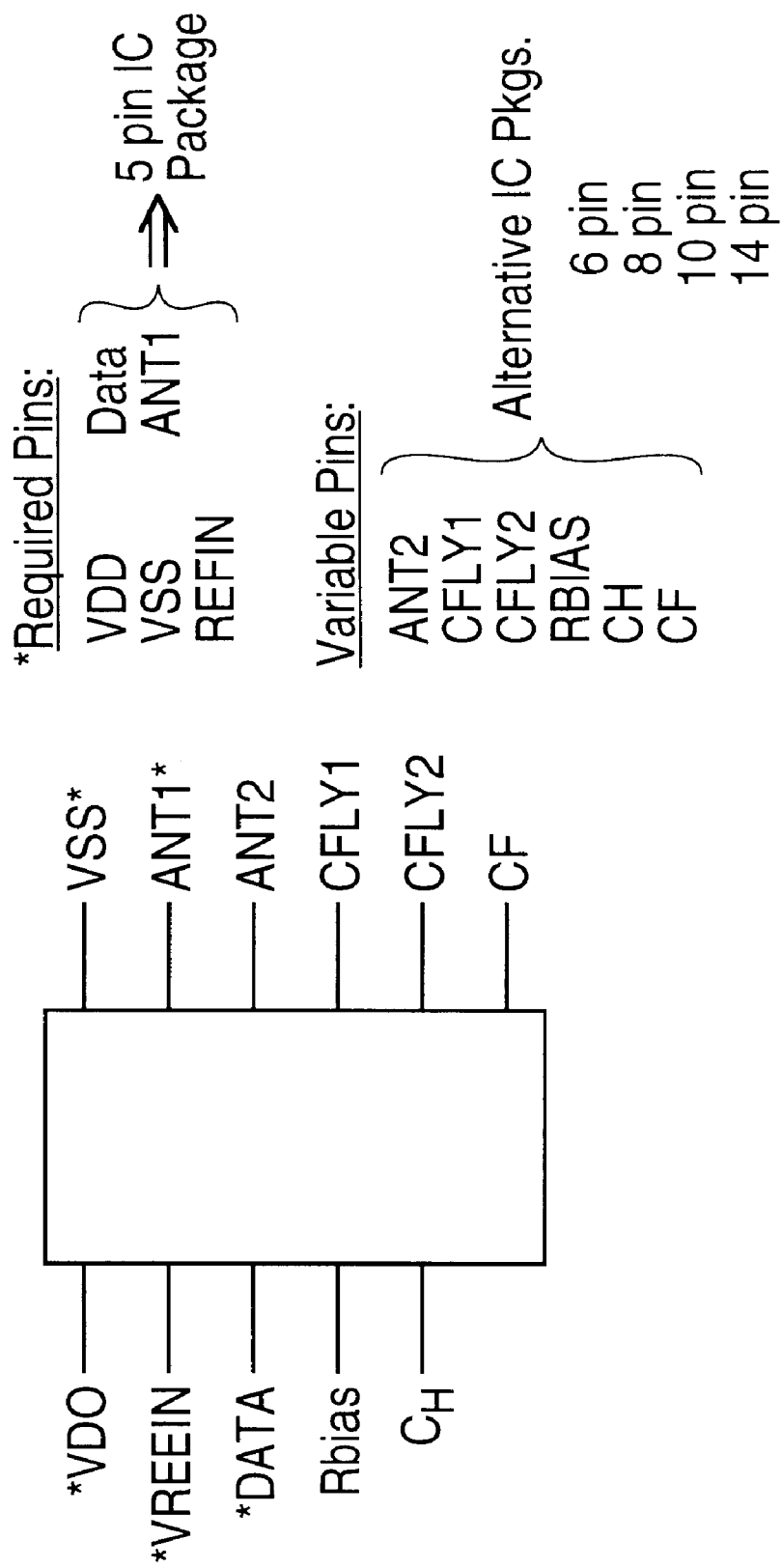
FIG. 2 identifies the pins of an integrated circuit incorporating the transmitter.

Numerous physical embodiments exist with this invention, depending on the intended applications and system requirements. The full embodiment is illustrated in FIG. 2, along with those signals which are required on the invention, and those which depend on the application, system requirements, and level of integration of the invention. By level of integration of the invention, we mean that one need not integrate the Charge Pump 7b, for example, but provide the function external to the invention. This removes the need to integrate the Charge Pump onto the invention, which may be more desirable than the more highly integrated invention.

Having said this, FIG. 2 illustrates that the minimum embodiment is a 5 pin IC package. Other package variations of 6, 8, 10, and 14 may be appropriate for the invention depending on the integration level of the invention.

Operation of Invention

System Operation—Introduction

The invention, Fully Integrated All-CMOS AM Transmitter with Automatic Antenna Tuning, converts an input (logic level) data sequence onto an amplitude modulated (AM) RF carrier. The transmit antenna forms part of the resonant network of the Differential (RF) Oscillator on the invention. This Differential Oscillator is enclosed within a closed-loop control system (a PLL). Consequently, the antenna resonance point is automatically tuned to the transmit frequency, which is an integer multiple of the Reference Oscillator on the invention.

Two Charge Pumps and appropriate control functions are included on the invention to (1) provide sufficient bias voltage for varactor diodes, and (2) allow the invention to function properly for externally applied bias supplies below 3V.

Reference Oscillator 1

A Reference Oscillator 1 develops the precision timing signal which is used by the phase-lock-loop to set the transmit frequency. The Reference Oscillator design is of the Colpitts variety, and is connected to a timing device external to the integrated circuit (IC). Typical timing devices are ceramic resonators, crystals, or (tuned) inductor-capacitor tank circuits. Phase lag capacitors generally associated with ceramic resonators are integrated onto the IC to lower cost.

The output from the oscillator is dc-coupled into a single-ended amplifier which provides differential outputs. The amplifier provides no dc gain. This eliminates any dc offset correction requirements. The amplifier output is differentially coupled into a comparator which limits the output waveform to logic level swings. The output stage of the comparator is ac current balanced to eliminate any unnecessary power supply noise. The Reference Oscillator design requires only a single IC pin for connection of the precision timing element or signal.

Finally, the Reference Oscillator design supports the application of an external (precision) timing signal rather than a timing element. The signal is applied at the same point on the invention as the timing element would be connected to.

Phase Detector 2

Phase Detector 2 provides a measure of the frequency difference between the output of the Reference Oscillator and the Differential Oscillator frequency divided by scale factor M (within the Div_M division function). The Phase Detector needs only to discriminate frequency differences; phase error in this phase-lock-loop (PLL) does not affect performance of the invention.

A digital phase-frequency detector is preferred for two reasons. Firstly, the circuit output is differential in nature. Secondly, when the PLL finally acquires frequency and phase lock, the phase-frequency detector output is a series of very narrow pulses in the time domain. Such a waveform is much easier to filter with an integrated Loop Filter than a phase detector that exhibits quadrature phase lock.

Loop Filter 3 and Filter Tune 3a

The output waveform of the Phase Detector contains both a dc and an ac term; the dc term represents the frequency error between the Reference Oscillator output and the Differential Oscillator divided by scale factor M. Only the dc term is of value; the ac term is removed by the Loop Filter.

The Loop Filter is a gm-c type, for at least three reasons. Firstly, the variance in gm-c filter characteristics is almost completely related to the gm variances, since integrated capacitors are well behaved. Secondly, a fairly high order filter may be constructed using only modest amounts of integrated capacitance, which reduces the cost of the invention. Thirdly such filters are easily 'tuned' to stabilize their characteristics against semiconductor process and temperature variations. Such tuning is provided in the invention from a tuning PLL Filter Tune 3a 'slaved' off the Reference Oscillator.

The function Filter Tune 3a is a PLL which is referenced to the Reference Oscillator. The PLL controls the bias current for a current-controlled-oscillator (ICO) within Filter Tune. The PLL adjusts the bias current to force the ICO frequency to equal the Reference Oscillator frequency. This may be accomplished directly or indirectly through the use of frequency prescalers (or frequency dividers). The resultant bias current is mirrored to provide the bias current for Loop Filter.

Track and Hold 4

During transmission of 'spaces' the Differential Oscillator is disabled. This 'breaks' the PLL closed loop frequency control system. A Track and Hold 4 is used to hold the PLL state just prior to disabling the Differential Oscillator, signifying a 'space' transmission. This is necessary for at least two reasons, (1) so that the PLL does not have to require frequency lock for each 'mark' transmission, and (2) to assure that the Differential Oscillator is not 'chirped' or swept in frequency as the PLL settles out during a 'mark' transmission.

The Data input to the Track and Hold is the signal which controls Track vs. Hold operation. During 'space' transmissions, the function is paced in the Hold mode.

Some applications may be better served (lower cost for the invention) by the use of an external hold capacitor (Ch) for the Track and Hold function, as shown in FIG. 1. However there are techniques available to integrate the effective hold capacitance onto the invention, with additional cost, and perhaps a modest compromise in the 'droop' of the hold voltage. For example, to support very low data rates, an external hold capacitor is preferred, but as the operational data rate increases, the impact of integrating this capacitor is less deleterious to cost and performance. So an alternative embodiment is the integration of Ch, which reduces the IC pin count by one.

Differential Oscillator 5

The Differential Oscillator is a voltage controlled oscillator (VCO) based on two cross-coupled Field Effect Transistors (FET's) where the antenna serves as the load impedance for the FET's. The cross-coupled FET structure provides the feedback for oscillatory behavior. The antenna is applied externally to the invention, differentially connected to the external bias supply, shown in FIG. 1 as L1 and L2. The antenna is brought coarsely in the range of the proper transmit frequency by connecting an external capacitor C1 across the external (differential) antenna as FIG. 1 illustrates. This sets the Differential Oscillator's nominal frequency of oscillation. This coarse capacitor can also be integrated on the same silicon further reducing external component requirements. By integrating the coarse capacitance on chip, the antenna design requirements are further restricted.

The Differential Oscillator frequency is adjustable via a dc control signal VAFC, which is the filtered output of the Phase Detector. Two reverse-biased p-n diffused-junctions are connected differentially across the cross-coupled FET's of the Differential Oscillator. As the dc level of VAFC varies, the capacitance of the reverse-biased p-n junctions varies inversely. This capacitance forms part of the resonant tank which sets the frequency of oscillation. Thus this differential varactor diode approach is the method used to modify the frequency of the oscillator. An alternative varactor approach is to use the CV characteristics available in an MOS diode.

The bias current for the Differential Oscillator is set via addition of resistor Rbias externally to the invention. A closed-loop voltage follower on the invention regulates a voltage based on the internal Bandgap Reference 8 on the invention. Rbias sets the current based on its value and the regulated voltage; this current is mirrored to the Differential Oscillator as the bias current. An alternative to providing Rbias externally is to integrate this onto the invention as a fixed, unmodifiable current. This will result in a fixed, unmodifiable transmit power level. If the on chip Rbias resistor is built as a digital to analog converter, the transmit power level can be varied by transmitting to the invention (via a separate input pin) a data pattern to set the desired transmit power level.

Input Data is used to electronically steer the bias current to the Differential Oscillator. During 'mark' transmissions, the bias current is connected to the Differential Oscillator. The Differential Oscillator then begins to oscillate, transmitting a RF carrier during the 'mark' interval. Alternatively, during a 'space', the bias current is disconnected from the Differential Oscillator, and so oscillation ceases, transmitting the equivalent of a 'space'.

Special back-to-back trapped drain Field Effect Transistor (FET) structures are employed at critical high frequency nodes of the Differential Oscillator to minimize capacitance and improve bandwidth. The preferred embodiment is circular drain structures, although other structures (octagonal, hexagonal, etc.) are acceptable. This structure has important ramifications, since the result is a very small capacitive parasitic at the drain node of the FET and a larger capacitance at the source node of the FET. This 'breaking-apart' of the normally equal drain and source parasitic capacitances actually further improves the gain-bandwidth (GBW) of the Differential Oscillator beyond just the improvement anticipated by a lowering of the drain capacitance. Said another way, the extra source capacitance actually improves GBW.

The invention employs a Differential Oscillator for a good reason, namely that such a structure driving a differential antenna results in reduced harmonic distortion of the transmitted signal. This is important in some critical applications, but is less important in other applications. Thus an alternative embodiment is the use of a non-differential oscillator where application requirements permit. This reduces the cost of the invention, as well as its pin count. It is anticipated that a differential scheme will be necessary to meet most international regulatory requirements similar to the United States FCC and Part 15 of the Code of Federal Regulations.

Prescaler 5a

The Differential Oscillator operates at a very high frequency, beyond the operating range of conventional CMOS logic dividers. So this frequency must be divided down by a high speed circuit before further division by conventional logic can take place. This circuit is the Prescaler 5a. The Prescaler is composed of a concanteration of high speed cross-coupled FET divide-by-two circuits.

The Prescaler is biased using a current which is tuned to the Reference Oscillator 1. This guarantees that the Prescaler bandwidth is temperature and process independent.

Special back-to-back trapped drain Field Effect Transistor (FET) structures are employed at critical high frequency nodes of the Prescaler to minimize capacitance and improve bandwidth.

Div M_6

Once the Differential Oscillator frequency is prescaled to an appropriate lower frequency, conventional CMOS logic dividers are used to further divide the frequency down to approximately the Reference Oscillator frequency. This is accomplished by division function Div_M 6.

Varactor Charge Pump 7a

The reverse-biased p-n junction capacitors (i.e., varactors) in the Differential Oscillator require a large bias potential for proper operation. On the other hand, the varactors require very little bias current. The need for extra circuitry to construct the varactor bias voltage depends on the magnitude of the bias supply externally supplied to the invention.

For applications where the external bias supply is in the vicinity of 12V, extra bias generation circuitry is not required. However, for lower external bias voltages, a circuit is required to synthesize a larger varactor bias voltage from the smaller external bias voltage. This function is preferentially accomplished by a voltage multiplying charge pump, since the load current is very small. Such a circuit in CMOS is easily integrated onto the invention without the need for additional components external to the invention. Thus no additional pins are required to provide this function within the invention.

Charge Pump 7b

Applications for this invention often demand operation with external bias supply voltages ranging from 12V down to below 3V. However, operation at bias voltages much below about 5V in CMOS is difficult without special processing (to lower FET threshold voltages), and the use of sub-micron or deep-sub-micron technology. To meet this requirement using inexpensive technology, a voltage multiplying Charge Pump 7b is included in the invention. The purpose of the Charge Pump is to synthesize supply voltages of sufficient magnitude (generally greater than approximately 4V) from externally applied voltages lower than this value. The Charge Pump output is then used instead of the external bias voltage to power-up the other elements of the invention which require this higher voltage.

The Charge Pump 7b is different from the Varactor Charge Pump 7a. Firstly, the Charge Pump must supply much larger output currents than the Varactor Charge Pump. Secondly, the Varactor Charge Pump is required for the invention to operate except in applications where the external supply voltage is approximately 12V. The Charge Pump however is only required for applications where the external supply voltage is below about 5V. Also, the Varactor Charge Pump requires no external pins on the IC package. The Charge Pump requires several package pins, for a pumping or 'flying' capacitor (Cfly), and for a filtering capacitor (CO on the synthesized output voltage.

Thus it is likely that there are several physical embodiments of the invention. It is perhaps most cost effective to include an Varactor Charge Pump on any physical embodiment of the invention since this costs no package pins and only modest CMOS die area. However the inclusion of the Charge Pump is expensive due both to die area and required package pins, and thus may not be included on embodiments intended for applications with greater than about 5V external supply voltages. One further alternative is not to include the Charge Pump on the physical construct of the invention, but to provide this function externally, for sub-5V supply applications.

Bandgap Reference 8

A Bandgap Reference circuit is included on the invention. The purpose of this function is to generate reference voltages which are temperature and supply voltage stable. Stable reference voltages are required to bias various critical nodes within the invention.

Alternative Embodiments and Enhancements

By implementing the invention in CMOS, it is economical to include encoder functions on the same IC since most of the applications for this type of radio transmitter include an encoder before the transmitter. The encoder can be either fixed or variable (i.e., programmable, like a microprocessor).

Other embodiments include the addition of a shutdown mode for low-power duty-cycling of the invention.

An encoder is a circuit function that generates an on/off data stream which ultimately turns on/off a transmitter function. The transmitter is generally either infrared based or RF based or electromagnetic field based. Obviously, other embodiments of a transmitter are possible.

The encoder on/off data stream can either be fixed or variable. An example of a fixed data stream would be one permanently programmed in an encoder circuit with either switches or jumper connections. An example of a variable encoder data stream is one similar to that used in rolling code encoder systems. Rolling code schemes are generally found in high security applications where the user is trying to evade capture of a valid encoder data stream for later broadcast to a receiving decoder. Generally, these rolling code encoder schemes embody erasable and reprogrammable memory circuits. In that this invention now allows full integration of at least one embodiment of a transmitter function, all of the encoder circuit schemes can be integrated on to one single silicon integrated circuit at a very low cost.

In that this invention is built on a CMOS process technology, a microprocessor or similar computing circuit element can be combined on the same silicon integrated circuit with the invention since modern day low-cost microprocessors are almost always constructed on a similar process.

The invention has certain performance limits today that are expected to change in the future. One such limit is the achievable upper operating frequency limit. One skilled in the art will readily recognize that the invention disclosed here can continue to be scaled as CMOS technology is scaled to continue applying the invention at higher and higher operating frequencies.

The United States agency that regulates unlicensed radio or RF transmitters is the FCC. The FCC has allocated certain frequency bands and emission types for which this type of device is intended. The World has several regulating bodies which in a similar manner control these same issues. In some instances, the World's other regulatory agencies are more restrictive in there operating rules. This invention is intended for operation under all of the World's various regulatory agency provisions.

The primary application of this invention, but certainly not the only application, is for automotive keyless entry, garage door openers, home keyless entry, security systems, remote door bell ringers. Obviously, there are numerous other applications that combine a simple transmitter with a digital data stream generation circuit.

This invention's uniqueness is further exemplified by the observation that a complete RF radio transmitting system can be built with no other external RF components except an antenna.

While the preferred embodiment of the invention is an AM type transmitter, one may also build an FM transmitter with virtually the same circuit techniques described herein. The modifications that are necessary to build FM transmission entail changing the PLL division ratio or reference frequency by the requisite frequency deviation for the system. This will force the control system to tune the antenna between any of a number of frequencies determined by the PLL feedback divisor or reference frequency values. In the limit, these values approach infinity. A simpler FM modification is also possible with the invention, namely varying the varactor diode bias directly. This is a more traditional technique of FM modulation although not currently done on CMOS silicon at the frequencies made possible by this invention.

As a result of the economy of scale associated with CMOS process technology, an extension of this invention is to build several transmitters on the same silicon die. This will allow one to build low-cost multi-channel systems which are either AM, FM, or otherwise. A multichannel system enhances the achievable data rate in much the same manner that increasing a digital systems data bus or address bus width.

What is claimed is:

1. A transmitter comprising:
   an oscillator forming part of a phase-lock loop (PLL);
   a modulator, said oscillator and said modulator being formed on a single monolithic chip;
   an antenna, said antenna forming part of a resonant network of the oscillator, a resonance point of said resonant network being automatically tuned to a transmit frequency of said transmitter; and
   a track and hold circuit coupled between the loop filter and the oscillator, the track and hold circuit being formed on the single monolithic chip, the track and hold circuit holding the phase-lock-loop state prior to disabling the oscillator in the event of a 'space' transmission,
   wherein the phase-lock-loop further includes a loop filter coupled between the phase detector and the oscillator, the loop filter being formed on the single monolithic chip.

2. The transmitter of claim 1, wherein the phase-lock-loop further includes a phase detector coupled to the oscillator, the phase detector being formed on the single monolithic chip.

3. The transmitter of claim 1, wherein the loop filter is a gm-c type filter.

4. The transmitter of claim 1, wherein the phase-lock-loop further includes a prescalar and a divide-by-M circuit coupled between the oscillator and the phase detector, the divide-by-M circuit and the prescalar formed on the single monolithic chip.

5. The transmitter of claim 1, wherein the oscillator includes a voltage controlled oscillator.

6. The transmitter of claim 1, wherein the oscillator includes a differential structure of varactor diodes for tuning a resonance point of the antenna to the frequency of the oscillator.

7. The transmitter of claim 1, further including a reference oscillator formed on the single monolithic chip, the reference oscillator supplying a single reference frequency to the phase detector.

8. The transmitter of claim 7, wherein the reference oscillator is of the Colpitts variety and is coupled to receive a signal from a timing device external to the single monolithic chip.

9. The transmitter of claim 1, further including a charge pump formed on the single monolithic chip for operating the single monolithic chip at low input power voltage levels, the charge pump supplying a voltage to the oscillator.

10. The transmitter of claim 1, further including a bandgap reference circuit formed on the single monolithic chip, the bandgap reference circuit generating reference voltages that are temperature and supply voltage stable.

11. The transmitter of claim 1, further including a data encoder formed on the single monolithic chip, the data encoder coupled between a data input pad and the oscillator.

12. A transmitter comprising:
   an oscillator forming Part of a phase-lock loop (PLL);
   a modulator, said oscillator and said modulator being formed on a single monolithic chip;
   an antenna, said antenna forming part of a resonant network of the oscillator, a resonance point of said resonant network being automatically tuned to a transmit frequency of said transmitter;
   a differential structure of varactor diodes for tuning a resonance point of the antenna to the frequency of the oscillator; and
   a varactor charge pump formed on the single monolithic chip to provide a bias charge for varactor diodes in the differential structure of varactor diodes.

13. The transmitter of claim 12, wherein the phase-lock-loop further includes a phase detector coupled to the oscillator, the phase detector being formed on the single monolithic chip.

14. The transmitter of claim 12, wherein the phase-lock-loop further includes a loop filter coupled between the phase detector and the oscillator, the loop filter being formed on the single monolithic chip.

15. The transmitter of claim 14, wherein the loop filter is a gm-c type filter.

16. The transmitter of claim 12, wherein the phase-lock-loop further includes a prescalar and a divide-by-M circuit coupled between the oscillator and the phase detector, the divide-by-M circuit and the prescalar formed on the single monolithic chip.

17. The transmitter cf claim 12, wherein the oscillator includes a voltage controlled oscillator.

18. The transmitter of claim 12, further including a reference oscillator formed on the single monolithic chip, the reference oscillator supplying a single reference frequency to the phase detector.

19. The transmitter of claim 18, wherein the reference oscillator is of the Colpitts variety and is coupled to receive a signal from a timing device external to the single monolithic chip.

20. The transmitter of claim 12, further including a charge pump formed on the single monolithic chip for operating the single monolithic chip at low input power voltage levels, the charge pump supplying a voltage to the oscillator.

21. The transmitter of claim 12, further including a bandgap reference circuit formed on the single monolithic chip, the bandgap reference circuit generating reference voltages that are temperature and supply voltage stable.

22. The transmitter of claim 12, further including a data encoder formed on the single monolithic chip, the data encoder coupled between a data input pad and the oscillator.

* * * * *